J. H. SCOTT.
VEHICLE WHEEL.
APPLICATION FILED APR. 26, 1907.

936,820.

Patented Oct. 12, 1909.

WITNESSES:
Grover C. Meinert.
John H. Scott, Jr.

INVENTOR
John H. Scott

UNITED STATES PATENT OFFICE.

JOHN H. SCOTT, OF JERSEY CITY, NEW JERSEY.

VEHICLE-WHEEL.

936,820.  Specification of Letters Patent.  Patented Oct. 12, 1909.

Application filed April 26, 1907. Serial No. 370,377.

*To all whom it may concern:*

Be it known that I, JOHN H. SCOTT, a citizen of the United States, and resident of Jersey City, in the county of Hudson and State of New Jersey, have invented certain new and useful Improvements in Vehicle-Wheels, of which the following is a specification.

This invention is an improvement in wheels, belonging to that class of such devices in which a resilient connection between the spokes and the rim of the wheel is effected in order that the use of pneumatic or cushioned tires may be unnecessary. To this end I provide in a vehicle wheel, a hub having a series of radiating spokes secured thereto, a rim, and a cap fitting over the outer end of each spoke having a curved spring attached intermediate its length, with its free ends connected to the rim.

Reference is to be had to the accompanying drawings forming a part of this specification, in which similar characters of reference indicate corresponding parts in both views.

Figure 1:
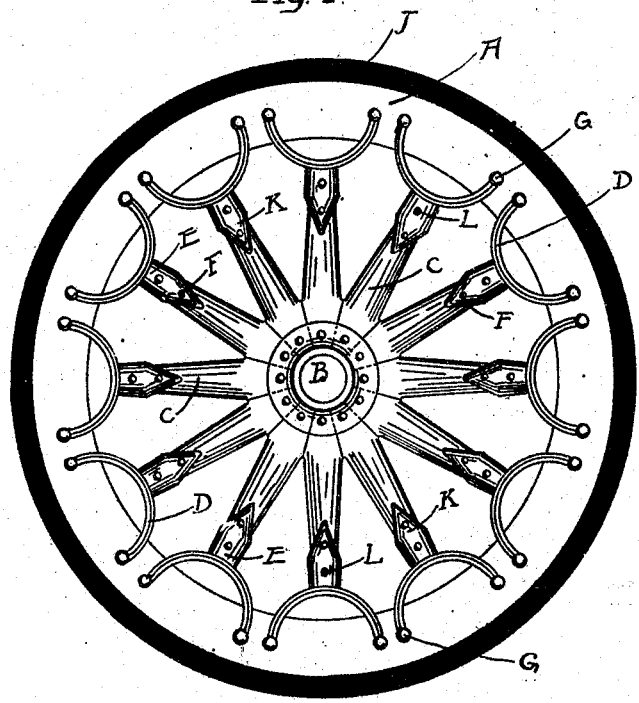
Figure 2:
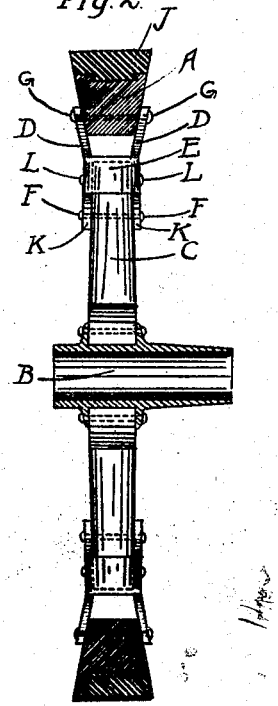

Figure 1 is a side elevation of a vehicle wheel embodying my invention; and Fig. 2 is a central cross-section of the same.

Specifically described, the wheel is made up of a suitable hub B having spaced flanges between which are riveted or otherwise rigidly secured a series of radiating spokes C. Over the outer end of each spoke fits a cap E, preferably having inwardly-projecting ears at opposite sides and securely attached to the spokes, preferably by the rivets F and L. The caps E are also provided with outwardly-extending curved springs D approximately semi-elliptical or crescent-shaped, one spring being arranged at each side of each cap, with which it is preferably integrally formed, as shown, or, if desired, attached in any other suitable manner. These springs diverge outwardly and engage the opposite sides of a rim A with which they are attached by rivets or other equivalent devices G, each rivet, as shown in Fig. 2, passing through alining apertures in the corresponding extremities of opposite springs.

The rim A, in the particular form of the invention illustrated, is shown to be made wedge-shaped in cross-section, with the enlarged portion arranged outwardly or peripherally to conform to the inclination of the springs. I have shown the rim A as constructed with a dove-tail groove or channel in its circumference for receiving the counterpart portion of a solid tire J, of rubber or other suitable elastic material. This, however, I do not claim as new or as forming a part of my invention, as I recognize that other types of tires might be used with equally as good results, it ordinarily only being necessary that the circumference of the rim have a groove or its equivalent for retaining the tire in place. By constructing the springs D to project at an inclination or diverge outwardly, the resiliency between the spokes and rim is not impaired, while on the other hand the connection between these parts is materially strengthened.

Having thus described my invention, I claim as new and desire to secure by Letters Patent:

1. In a vehicle wheel, the combination of a hub having a series of spokes, a rim, and curved springs arranged in pairs, each pair having a cap intermediate of its length fitting over the outer end of one of the spokes, with the ends of one of the springs of each pair attached to one of the side faces of the rim, and the ends of the other spring of each pair attached to the other side face of the rim.

2. In a vehicle wheel, the combination of a hub having a series of radiating spokes secured thereto, a rim, and a cap fitting over the outer end of each spoke having curved springs in connection therewith, one at each side thereof, with the springs of each cap diverging outwardly and each connected at both ends to the rim.

3. In a vehicle wheel, the combination of a series of spokes rigidly connected together, a cap secured over the outer end of each spoke, a rim approximately wedge-shaped in cross-section, with the enlarged portion thereof arranged outwardly, and springs carried at the opposite sides of each cap and embracing the opposite sides of the rim and lying in planes parallel thereto.

Signed at city of New York in the county of New York and State of New York this ninth day of April A. D. 1907.

JOHN H. SCOTT.

Witnesses:
  GEORGE W. FINK,
  JOHN R. MEINERS.